US011859641B2

(12) United States Patent
Petersen, Jr. et al.

(10) Patent No.: US 11,859,641 B2
(45) Date of Patent: Jan. 2, 2024

(54) NOISE ABATEMENT FOR AIR BLOWERS

(71) Applicants: James E. Petersen, Jr., Houston, TX (US); Michael David Roush, The Woodlands, TX (US)

(72) Inventors: James E. Petersen, Jr., Houston, TX (US); Michael David Roush, The Woodlands, TX (US)

( * ) Notice: Subject to any disclaimer, the term of this patent is extended or adjusted under 35 U.S.C. 154(b) by 0 days.

(21) Appl. No.: 16/950,410

(22) Filed: Nov. 17, 2020

(65) Prior Publication Data

US 2021/0156400 A1 May 27, 2021

Related U.S. Application Data

(60) Provisional application No. 62/941,119, filed on Nov. 27, 2019.

(51) Int. Cl.

| | |
|---|---|
| ***F04D 29/66*** | (2006.01) |
| ***F04D 29/42*** | (2006.01) |
| ***G10K 11/16*** | (2006.01) |
| ***F04D 29/28*** | (2006.01) |
| ***F04D 29/44*** | (2006.01) |
| ***F01N 13/00*** | (2010.01) |

(52) U.S. Cl.
CPC ......... *F04D 29/664* (2013.01); *F01N 13/007* (2013.01); *F04D 29/281* (2013.01); *F04D 29/4206* (2013.01); *F04D 29/4213* (2013.01); *F04D 29/4226* (2013.01); *F04D 29/441* (2013.01); *G10K 11/16* (2013.01); *G10K 11/161* (2013.01); *F05D 2260/963* (2013.01)

(58) Field of Classification Search
CPC ............. F04D 29/4206; F04D 29/4213; F04D 29/4226; F04D 29/441; F04D 29/664; F04D 29/666; F05D 2260/963; G10K 11/16; G10K 11/161; F01N 13/007; B60H 2001/006; F24F 13/24
USPC .......................................................... 452/262
See application file for complete search history.

(56) References Cited

U.S. PATENT DOCUMENTS

| | | | | |
|---|---|---|---|---|
| 1,037,659 A | | 9/1912 | Rembert | |
| 1,274,058 A | | 7/1918 | Kutsche | |
| 1,785,918 A | | 12/1930 | Stebbins | |
| 1,815,529 A | | 7/1931 | Shurtleff | |
| 2,073,951 A | * | 3/1937 | Norman | F04D 29/664 181/252 |
| 2,209,607 A | | 7/1940 | Nutting | |
| 2,289,474 A | | 7/1942 | Anderson | |
| 2,293,590 A | | 8/1942 | Chance | |
| 2,593,294 A | | 4/1952 | Goldberg | |

(Continued)

FOREIGN PATENT DOCUMENTS

| | | | | |
|---|---|---|---|---|
| DE | 202010016847 U1 | * | 5/2012 | F04D 29/4213 |
| EP | 3128184 A1 | * | 2/2017 | F04D 29/4206 |

(Continued)

*Primary Examiner* — Justin D Seabe
(74) *Attorney, Agent, or Firm* — Amatong McCoy LLC; Michael S. McCoy

(57) ABSTRACT

An air blower is provided. The blower includes a flow modulator tube assembly positioned to modulate the flow of air into the blower and to modulate the flow of sound out of the blower. The blower also includes a sound damper. The flow modulator tube assembly directs sound to the sound damper, and the sound damper absorbs and/or reflects the sound.

26 Claims, 6 Drawing Sheets

(56) References Cited

U.S. PATENT DOCUMENTS

| | | | | |
|---|---|---|---|---|
| 2,780,308 | A | 2/1957 | Mullin et al. | |
| 2,916,101 | A * | 12/1959 | Naman | G10K 11/172 181/224 |
| 3,796,511 | A | 3/1974 | Hansen | |
| 3,827,482 | A | 8/1974 | Pope | |
| 3,942,500 | A | 3/1976 | Koehm et al. | |
| 4,361,490 | A | 11/1982 | Saget | |
| 4,382,804 | A | 5/1983 | Mellor | |
| 4,468,234 | A | 8/1984 | McNicholas | |
| 4,832,709 | A | 5/1989 | Nagyszalanczy | |
| 4,877,424 | A | 10/1989 | Perkola et al. | |
| 4,986,170 | A * | 1/1991 | Ramakrishnan | F24F 7/08 181/224 |
| 5,000,769 | A | 3/1991 | Raguideau et al. | |
| 5,766,315 | A | 6/1998 | Moredock | |
| 6,293,751 | B1 | 9/2001 | Stockstill | |
| 6,648,935 | B2 | 11/2003 | Petersen, Jr. | |
| 6,892,851 | B2 * | 5/2005 | Lee | E04F 17/04 165/135 |
| 7,789,194 | B2 * | 9/2010 | Lathrop | A61M 16/16 181/225 |
| 7,832,524 | B2 * | 11/2010 | Mueller | F04D 29/664 181/229 |
| 8,197,188 | B2 * | 6/2012 | Clay | F04D 29/4213 415/119 |
| 8,231,334 | B2 * | 7/2012 | Lind | F04D 29/441 415/119 |
| 9,587,649 | B2 * | 3/2017 | Oehring | E21B 43/26 |

FOREIGN PATENT DOCUMENTS

| | | | | |
|---|---|---|---|---|
| GB | 687031 | A | 2/1953 | |
| JP | 62276297 | A | 12/1987 | |
| KR | 100891622 | B1 * | 4/2009 | F04D 25/08 |
| SU | 348214 | A1 | 9/1972 | |

* cited by examiner

FIGURE 2A
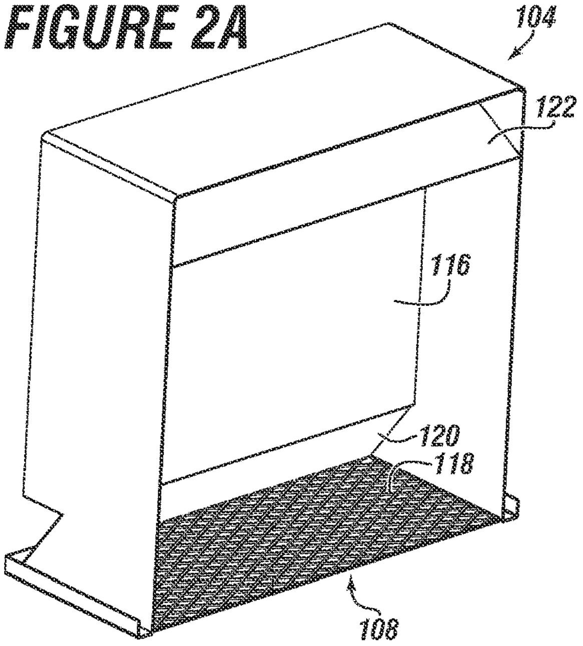
FIGURE 2C
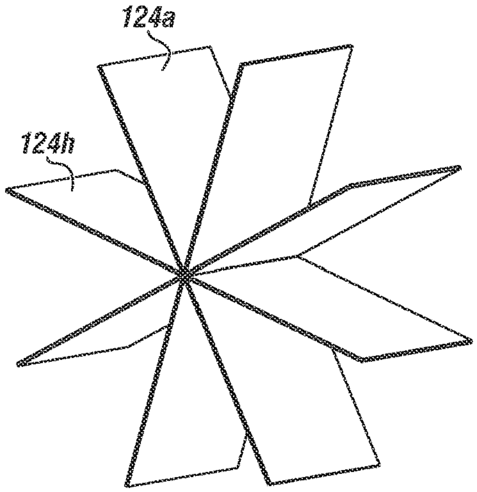
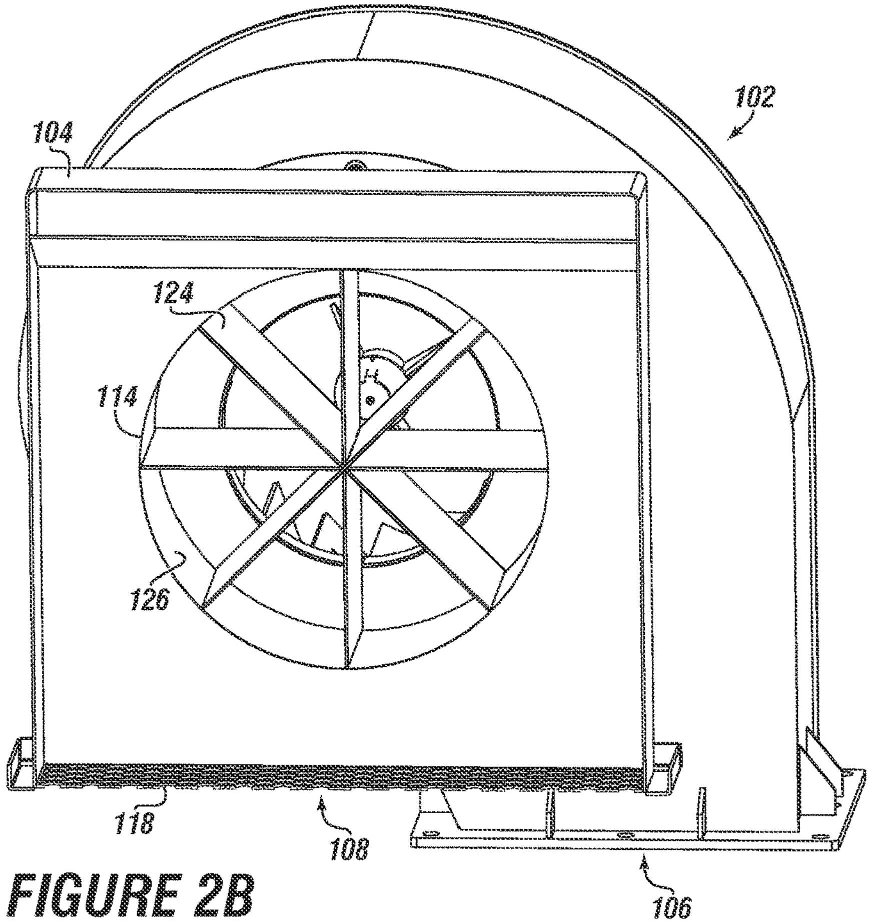
FIGURE 2B

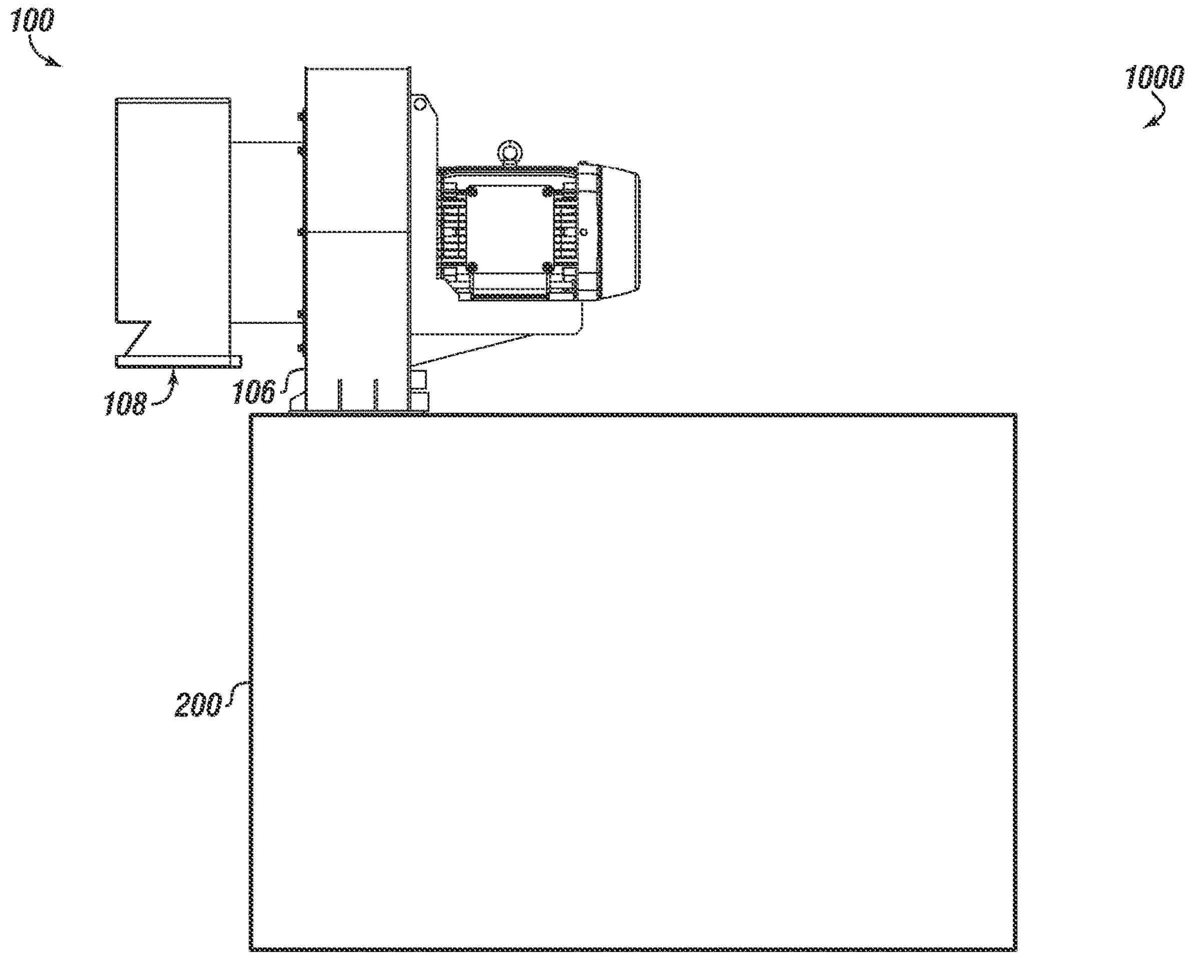
FIGURE 4A
FIGURE 4B
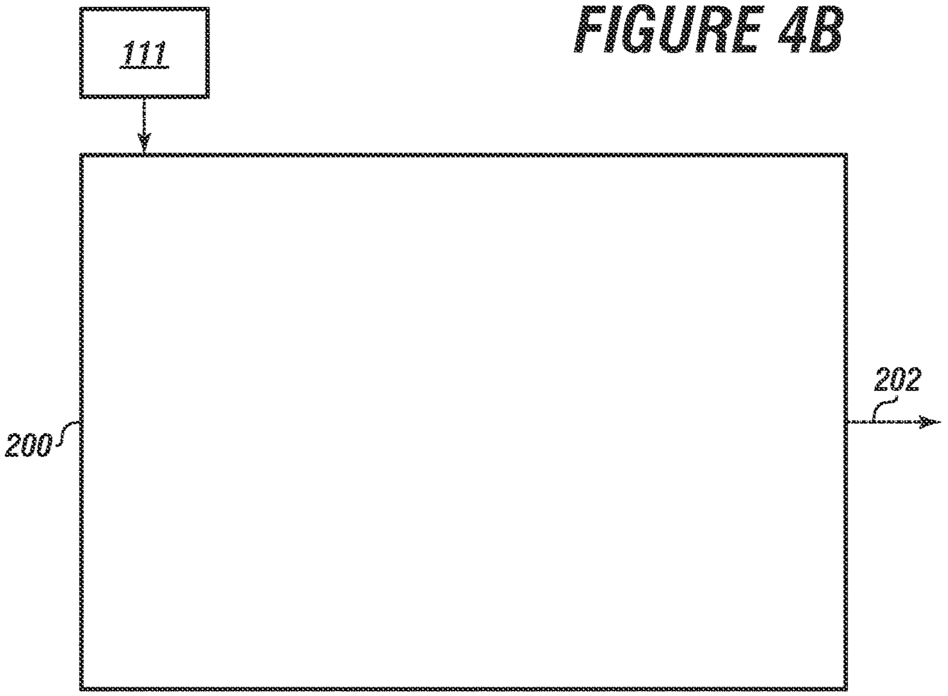

NOISE ABATEMENT FOR AIR BLOWERS

CROSS-REFERENCE TO RELATED APPLICATIONS

The present application claims the benefit of U.S. Provisional Patent Application No. 62/941,119, entitled "NOISE ABATEMENT FOR AIR BLOWERS", filed on Nov. 27, 2019, the entirety of which is incorporated herein by reference.

FIELD

The present disclosure relates to apparatus and systems for noise abatement for air blowers and to methods of making and using the same.

BACKGROUND

Blowers (air blowers) are used for cooling and ventilation, and operate by drawing in environmental air, cleaning the air of contaminants, and then providing the cleaned air to equipment (e.g., electric motors) or to a local environment, depending on the particular application. Blowers include moving parts, such as impeller blades. The movement of such parts, which sometimes move relative to static portions of the blowers, such as a housing, results in the formation of noise. Sounds emitted by equipment, such as blowers, contributes to noise pollution. It would be desirable to abate the noise of blowers.

BRIEF SUMMARY

Some embodiments of the present disclosure include an air blower. The air blower includes an intake housing having an inlet. The inlet is positioned to receive air into the air blower. An impeller is positioned to draw the air through the intake housing and into the impeller. An outlet is positioned to receive air from the impeller and expel the air from the air blower. A flow modulator tube assembly is positioned to receive the air from the intake housing and to direct the air to the impeller. The flow modulator tube assembly includes a plurality of vanes positioned within a shell. The vanes extend axially along a length of the shell and define a plurality of modulated air flow paths through the flow modulator tube assembly. A sound damper is positioned within the intake housing. The flow modulator tube assembly is positioned to direct at least some sound traveling therethrough to the sound damper, and wherein the sound damper absorbs at least some of the sound directed thereto. The flow modulator tube assembly and the sound damper attenuate sound emanating from the air blower during operation of the air blower.

Some embodiments of the present disclosure include a method of attenuating sound emanating from an air blower. The method includes directing at least some sound within the air blower through a flow modulator tube assembly that is positioned within an intake housing of the air blower. The flow modulator tube assembly includes a plurality of vanes positioned within a shell. The vanes extend axially along a length of the shell and define a plurality of modulated flow paths through the flow modulator tube assembly. The method includes directing at least some of the sound from the flow modulator tube assembly to a sound damper that is positioned within the intake housing of the air blower. The sound damper absorbs at least some of the sound.

Some embodiments of the present disclosure include a system including an air blower. The air blower includes an intake housing having an inlet positioned to receive air into the air blower, an impeller positioned to draw the air through the intake housing and into the impeller, and an outlet positioned to receive air from the impeller and expel the air from the air blower. A flow modulator tube assembly is positioned to receive the air from the intake housing and direct the air to the impeller. The flow modulator tube assembly includes a plurality of vanes positioned within a shell that extend axially along a length of the shell and define a plurality of modulated air flow paths through the flow modulator tube assembly. A sound damper is positioned within the intake housing. The flow modulator tube assembly is positioned to direct at least some sound traveling therethrough to the sound damper, and the sound damper absorbs at least some of the sound directed thereto. The flow modulator tube assembly and the sound damper attenuate sound emanating from the air blower during operation of the air blower. The outlet of the air blower is fluidly coupled with equipment for cooling the equipment or is fluidly coupled with a local environment for providing ventilation to the local environment.

BRIEF DESCRIPTION OF THE DRAWINGS

So that the manner in which the features and advantages of the systems, apparatus, and methods may be understood in more detail, a more particular description may be had by reference to the embodiments which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 2A is a perspective view of an air intake housing of the air blower, in isolation from a remainder of the air blower.

FIG. 2B depicts a flow modulator tube assembly and impeller of the air blower, in isolation from a remainder of the air blower.

FIG. 2C depicts vanes of the flow modulator tube assembly, in isolation from a remainder of the flow modulator tube assembly.

FIG. 4A depicts an air blower fluidly coupled with equipment or a local environment.

FIG. 4B depicts an air path for air to enter into the equipment or local environment from the air blower.

Figure 1A:
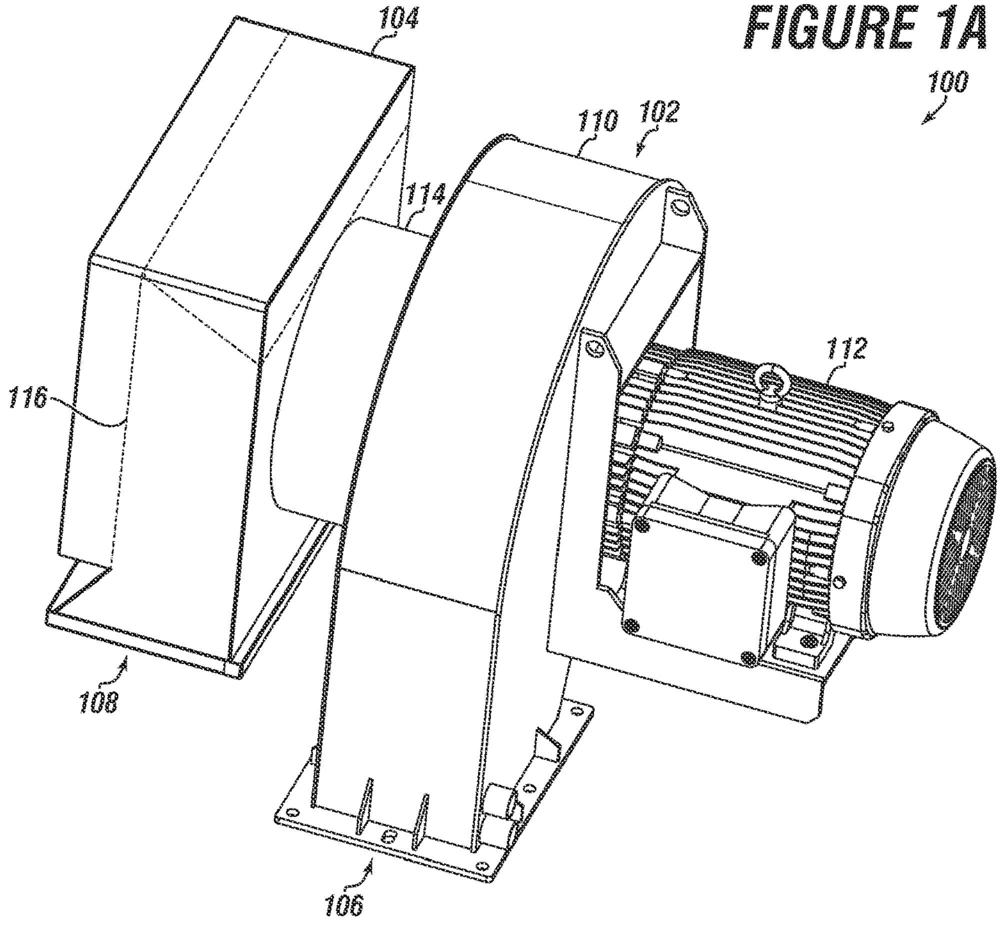
FIG. 1A is a top perspective view of an air blower.
Figure 1B:
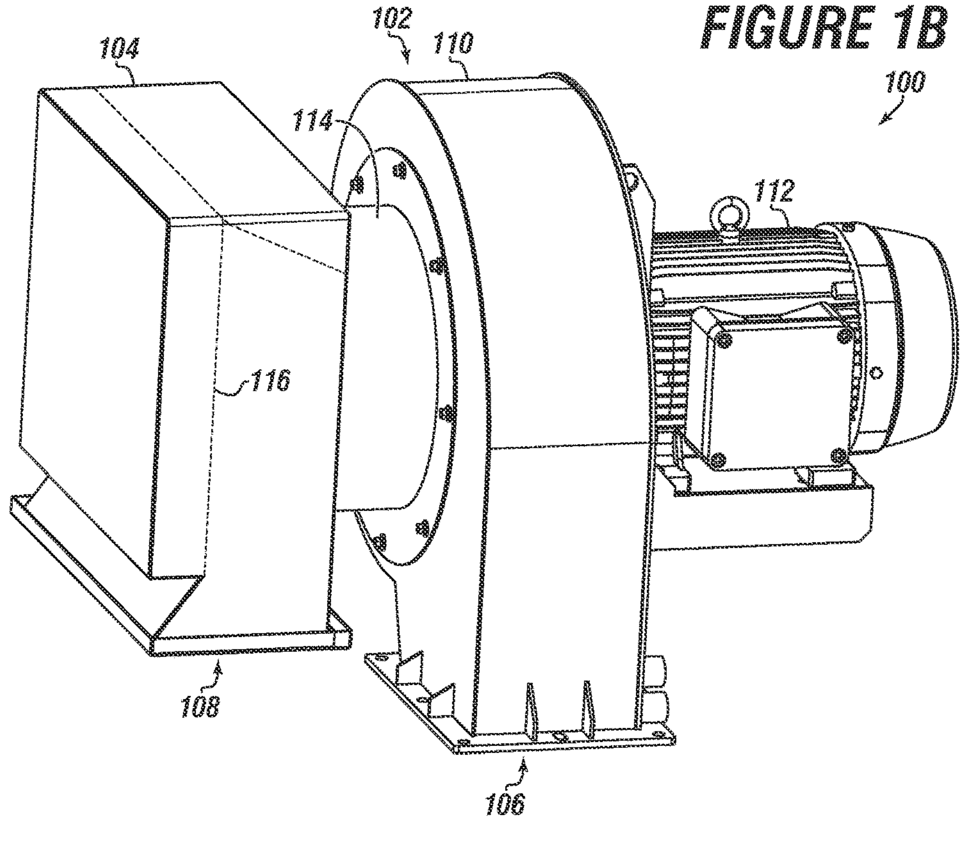
FIG. 1B is a side perspective view of the air blower.
Figure 1C:
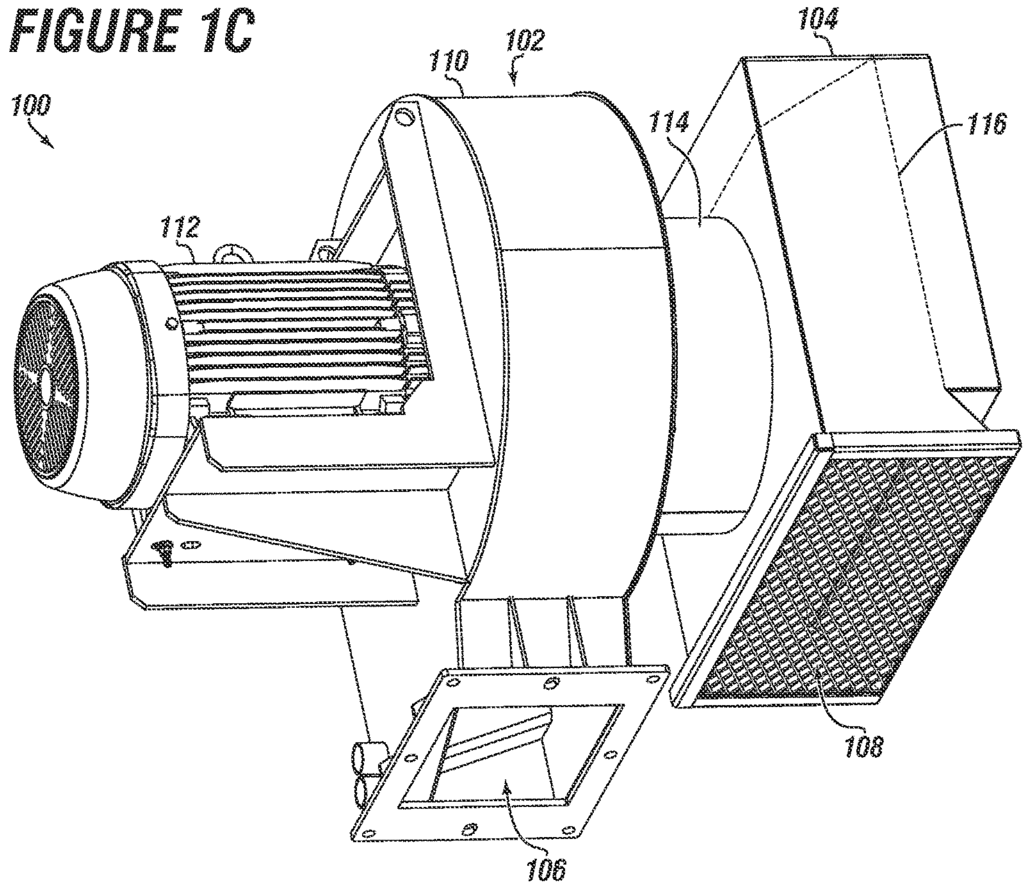
FIG. 1C is a bottom perspective view of the air blower.
Figure 1D:
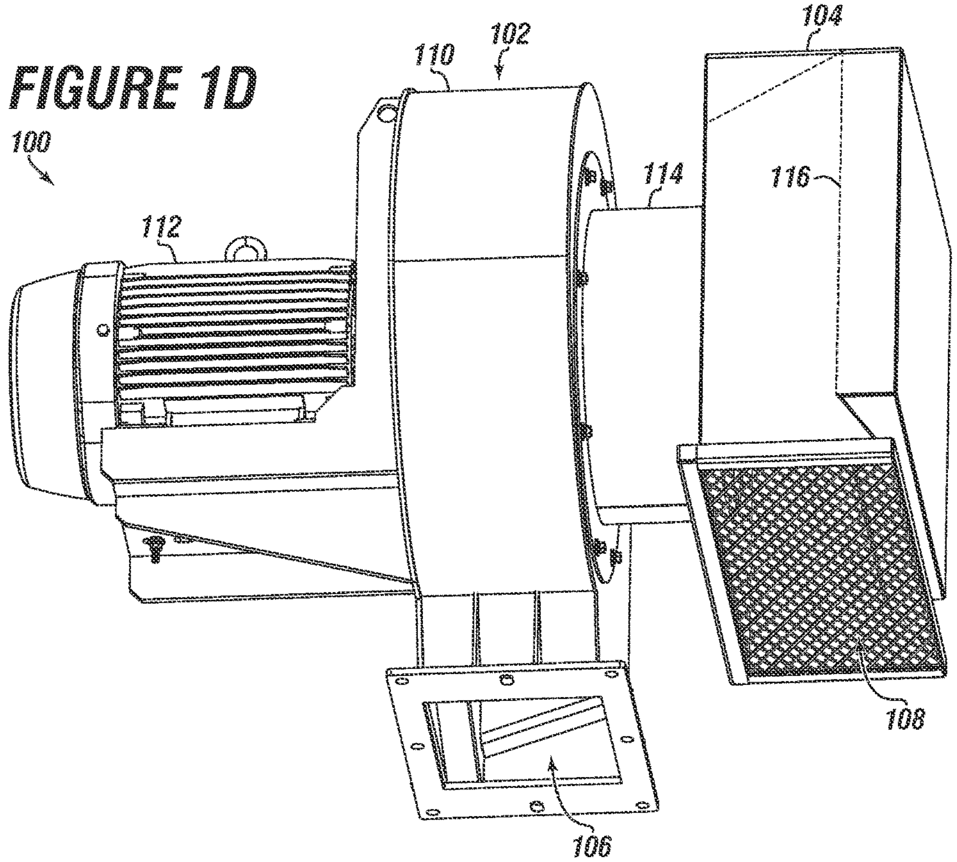
FIG. 1D is another bottom perspective view of the air blower.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include apparatus, systems, and methods for noise abatement in equipment, such as air blowers. As used herein, "noise abatement" refers to the elimination or reduction of noise. For example, a piece of equipment may emit noise at a first intensity (decibels) during operation of the piece of equipment without the noise abatement features disclosed herein incorporated into the piece of equipment. After incorporation of the noise abatement features disclosed herein into the piece of equipment, the piece of equipment may emit noise at a second intensity (decibels) during operation of the piece of equipment, wherein the second intensity is less than the first intensity. In some embodiments, the apparatus, systems, and/or methods for noise abatement disclosed herein function to dampen the noise produced by the equipment. During propagation of sound, sound waves can be reflected, refracted, and/or attenuated by the noise abatement features disclosed herein. The apparatus, systems, and/or methods for noise abatement disclosed herein may be incorporated into equipment including, but not limited to air blowers.

Air Blowers

Some embodiments of the present disclosure include apparatus, systems, and methods for the abatement of noise produced by air blowers, also referred to as extracting blowers. The noise abatement apparatus, systems, and methods disclosed herein may be used in air blowers that supply air to equipment or local environments. As used herein, a "local environment" is a discrete, at least partially enclosed space. For example, the local environment may be a residence, a building, a mobile enclosure or other facility or interior space thereof. Air blowers can be used for cooling and ventilation, in sand blasting booths, and other applications. Air blowers operate to intake atmospheric air, which may include liquid and solid particles, and to separate the liquid and solid particles from the atmospheric air to generate clean air. Air blowers can be used in a variety of industries to provide cooling air to personnel, structures and equipment. In some embodiments, the air supplied is cooling air (i.e., the air is supplied to cool, for example, a piece of equipment or an environment). For example, and without limitation, in some embodiments the noise abatement apparatus, systems, and methods disclosed herein are used in air blowers that supply cooling air to electric motors for cooling the motors. However, the noise abatement apparatus, systems, and methods disclosed herein are not limited to use with air blowers that supply cooling air to electric motors, and may be used in other air blower applications as well. In some embodiments, the noise abatement apparatus, systems, and methods disclosed herein are used in an extracting blower in accordance with U.S. Pat. No. 6,648,935. For example, an extracting blower in accordance with U.S. Pat. No. 6,648,935 may be retrofitted and/or modified to include the noise abatement apparatus and/or systems disclosed herein, or an extracting blower otherwise in accordance with U.S. Pat. No. 6,648,935 may include the noise abatement apparatus and/or systems disclosed herein.

With reference to FIGS. 1A-1D, an air blower (also referred to as a "blower") in accordance with at least one embodiment will now be described. Blower 100 includes impeller assembly 102 including impeller housing 110. Impeller 102 is powered by blower motor 112, such that blower motor 112 drives rotation of the blades (not shown) of impeller 102. Blower 100 includes air intake housing 104 including air inlet 108. With impeller blades rotating, impeller 102 draws intake air through air inlet 108 and into impeller housing 110, optionally air is cleaned within impeller assembly 102, and then impeller 102 expels the air from air outlet 106. For example, the air may be expelled from air outlet 106 and into an electric motor for cooling the electric motor, into a local environment for cooling the environment, or to another location or piece of equipment.

The movement of the blades of the impeller 102 within impeller housing 110, and the movement of inlet air through air intake housing 104 and impeller housing 110 produces noise. Blower 100 includes multiple noise abatement components that reduce the noise emanating from blower 100, relative to the noise that would emanate from the blower if the blower did not include the noise abatement components. The noise abatement components of blower 100 include: (1) a non-linear (e.g., circuitous or serpentine) air inlet flow path (not shown) of intake air into inlet 108 and from inlet 108 to impeller 102; (2) flow modulator tube assembly 114; and (3) sound damper 116. The structure and operation of each of these noise abatement components will be described in more detail below with reference to FIGS. 2A-3B.

Noise Abatement Features in the Air Blower

With reference to FIG. 2A, air intake housing 104 is shown in isolation from the remainder of the blower. In operation, intake air enters air intake housing 104 through a grill 118. Air intake housing 104 provides a sufficiently broad opening for intake air such that a low-pressure drop is maintained, lowering the risk of the intake air from becoming turbulent within air intake housing 104. Air intake housing 104 includes angled housing walls and/or baffles positioned along the flow path of air and sound therethrough, which function to modulate the direction of flow of air therethrough and the propagation of sound therethrough. For example, as shown in FIG. 2A, air intake housing 104 includes first baffle 120 positioned adjacent inlet 108 and second baffle 122 positioned opposite the inlet from the air intake housing 104 into the flow modulator tube assembly 114. Baffles 120 and 122 contribute to the formation of a circuitous flow path of the intake air within intake housing 104, such that the intake air follows a non-linear flow path within intake housing 104, prior to entering flow modulator tube assembly 114.

Figure 2D:
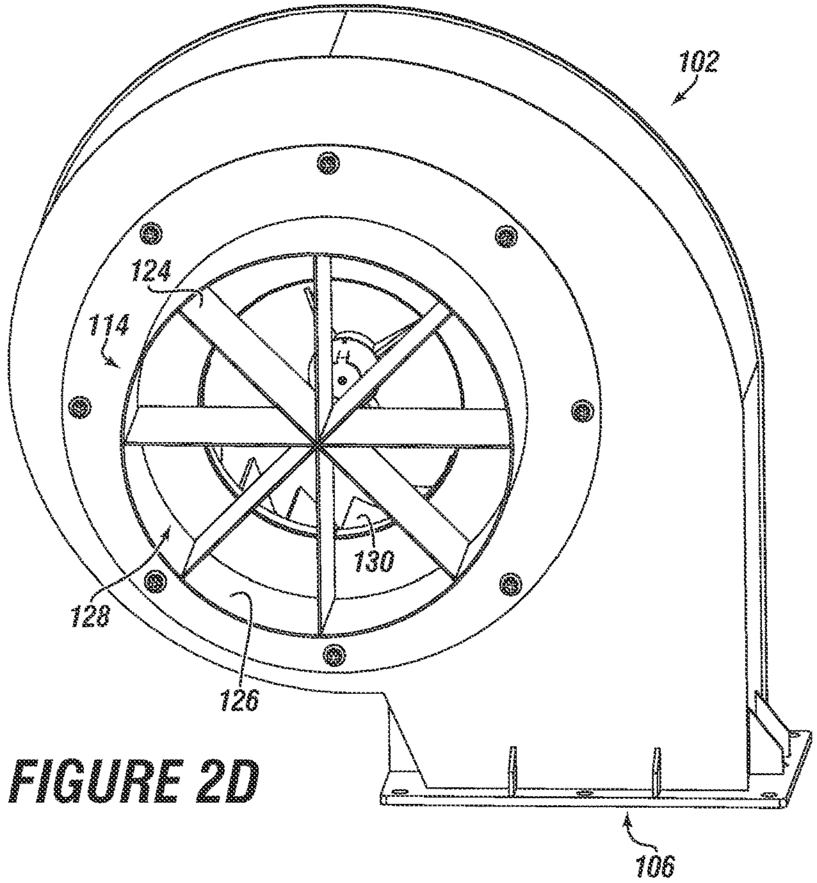
FIG. 2D depicts the flow modulator tube assembly and impeller of the air blower, in isolation from a remainder of the air blower.

FIG. 2B shows flow modulator tube assembly 114, which is in fluid communication with air intake housing 104 and positioned for receipt of the intake air therefrom. As shown in FIGS. 2B and 2D, flow modulator tube assembly 114 includes vanes 124 positioned within shell 126. In some embodiments, flow modulator tube assembly 114 includes eight vanes 124. However, flow modulator tube assembly 114 may include more or less than eight vanes. Vanes 124 may function as straightening vanes, modulating the flow of intake air therethrough to conduct the intake air into the impeller 102 in a more uniformly-distributed and orderly manner than would occur in the absence of vanes 124. In the embodiment shown in FIG. 2D, flow modulator tube assembly 114 divides the flow of intake air into eight separate portions or modulated flow paths 128, as defined by the space between adjacent vanes 124. Without being bound by theory, vanes 124 may operate to straighten the flow of intake air by reducing the occurrence of turbulent flow of intake air. Each pair of adjacent vanes 124 defines a modulated flow path 128 therebetween through which the intake air flows. Each modulated flow path 128 may be isolated from other modulated flow paths of the flow modulator tube assembly 114. FIG. 2C depicts vanes 124*a*-124*h* arranged together, but in isolation from the shell that surrounds the vanes in the flow modulator tube assembly 114. The flow modulator tube assembly disclosed herein may include vanes positioned and arranged to define modulated flow paths of equal volume, as shown, or vanes positioned and arranged to define modulated flow paths of different volumes. The vanes 124 may extend axially within shell 126. In FIG. 2D, the inlet into impeller 102, from flow modulator tube assembly 114, is shown, where the inlet air is drawn by the impeller blades 130 of impeller 102. Without being bound by theory, it is believed that at least some of the sound that enters flow modulator tube assembly 114 may become at least temporarily trapped therein, propagating back and forth within the flow modulator tube assembly 114.

Figure 2E:
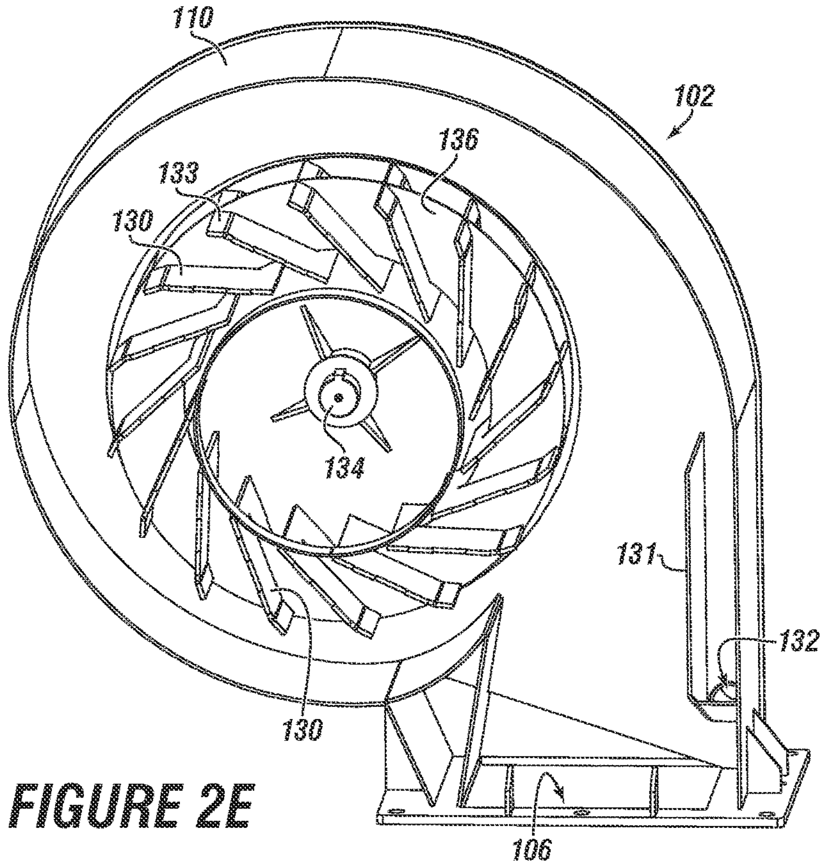
FIG. 2E depicts the impeller of the air blower, in isolation from a remainder of the air blower.

With reference to FIG. 2E, the impeller blades 130 of impeller 102 rotate to draw air in from air intake housing 104 and direct air through outlet 106. The impeller blades 130 may be arranged within the impeller housing 110 to direct contaminates within the intake air, such as dust or water, to the contaminate outlet 132. Contaminate outlet 132, or a flow path thereto, is at least partially defined by baffle wall 131. In some embodiments, the impeller assembly 102 is arranged in a manner that is the same as or similar to the blower of U.S. Pat. No. 6,648,935 to expel contaminates. As such, impeller assembly 102 provides at least partially cleaned air to outlet 106, where the at least partially cleaned air is provided to a piece of equipment or a local environment as intake air to that piece of equipment or local environment, for example. The rotation of impeller blades 130 is driven by blower motor 112. For example, blower motor 112, which may be an electric motor, may include or be coupled with drive shaft 134. Blower motor 112 drives the rotation of shaft 134, which is coupled with impeller plate 136, such that shaft 134 drives the rotation of plate 136. Plate 136 includes impeller blades 130 thereon, such that plate 136 drives rotation of impeller blades 130, drawing air into impeller assembly 102 and pushing the air out of outlet 106.

Impeller blades 130 include one or more features that improve efficiency of blower 100 and reduce noise produced by blower 100. For example, impeller blades 130 include backward-inclined blades, as shown in FIG. 2E. Also, the outer tips of each blade 130 are bent (e.g., by approximately 20°) to reduce the tendency of air turbulence in impeller assembly 102, as shown in FIG. 2E as bent tips 133.

Figure 3A:
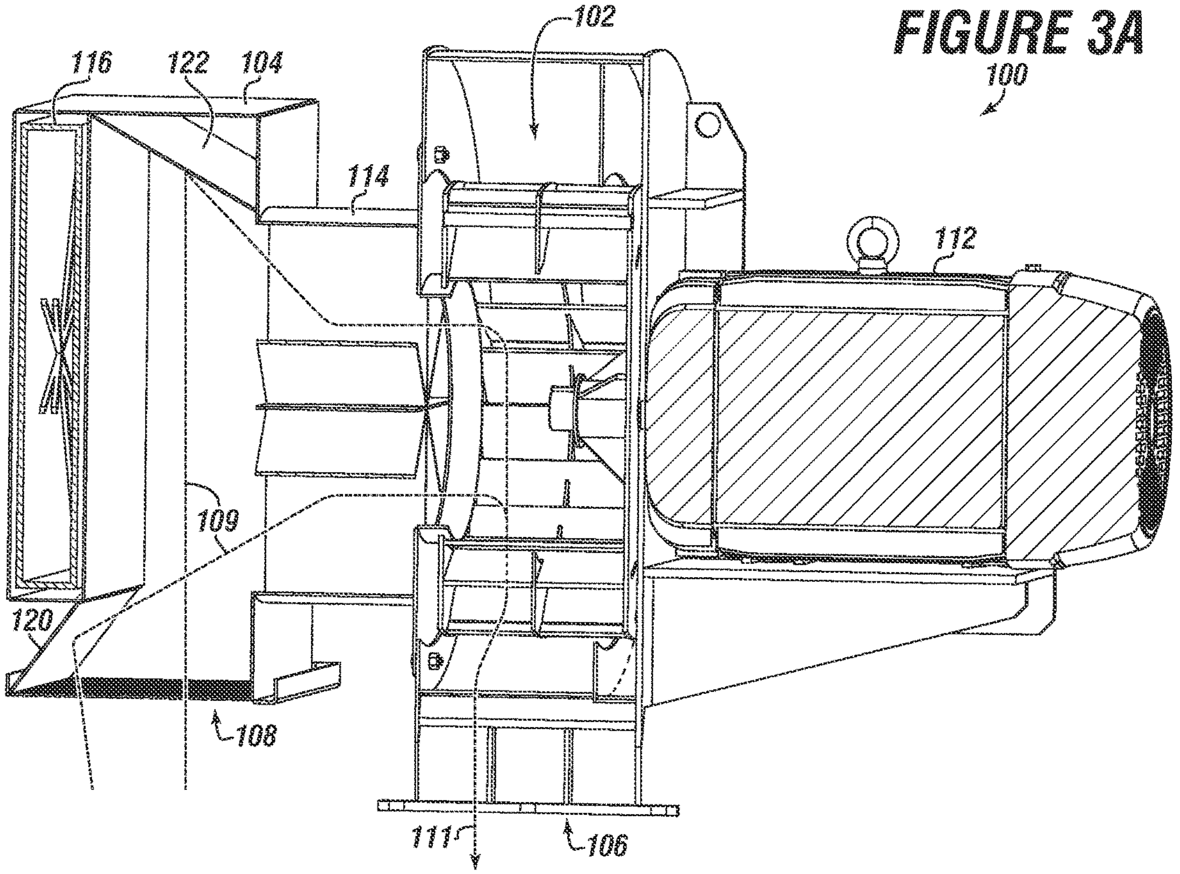
FIG. 3A is a cross-sectional, side view of the air blower showing an exemplary flow path of intake air therethrough.

With references to both FIG. 3A, the flow path of air through air blower 100 is depicted. Intake air 109 flows upwards into air intake housing 104 to the entrance of the flow modulator tube assembly 114. The flow path for intake air 109 into the flow modulator tube assembly 114 is at an angle (e.g., a nominally 90° angle) relative to the flow path for intake air into inlet 108. As shown by the broken line arrows, at least some of the intake air 109 impacts first baffle 120 within intake housing 104, contributing to the circuitous flow path of the intake air 109 within intake housing 104. Also, at least some of the intake air 109 impacts second baffle 122 within intake housing 104, contributing to the circuitous flow path of the intake air 109 within intake housing 104. The intake air 109, after following a non-linear path within intake housing 104, enters the flow modulator tube assembly 114. Thus, intake air 109 turns (e.g., 90°) within air intake housing 104 to enter the flow modulator tube assembly 114. After passing through impeller assembly 102, exhaust air 111 is expelled from impeller assembly 102 through air outlet 106. Exhaust air 111 may be cleaner than intake air 109. That is, exhaust air 111 may have a reduced content of contaminate (e.g., particulate) relative to the content of contaminate in intake air 109 due to the removal of contaminates by impeller assembly 102.

Mechanisms of Noise Reduction in Air Blowers

The noise abatement components of blower 100 significantly reduce the amount of unwanted sound emanating from the blower 100. The operation of blowers, as well as the equipment that the blowers are providing air to, produces both airborne and structure-borne sounds. That is, the flow of air into the blower produces sounds, and the movement and vibration of portions of the blower, such as the impeller, also produces sounds. The noise abatement components of blower 100 effectively reduce the amount of noise that would otherwise emanate from the blower, while still providing sufficient air to equipment or environments.

Figure 3B:
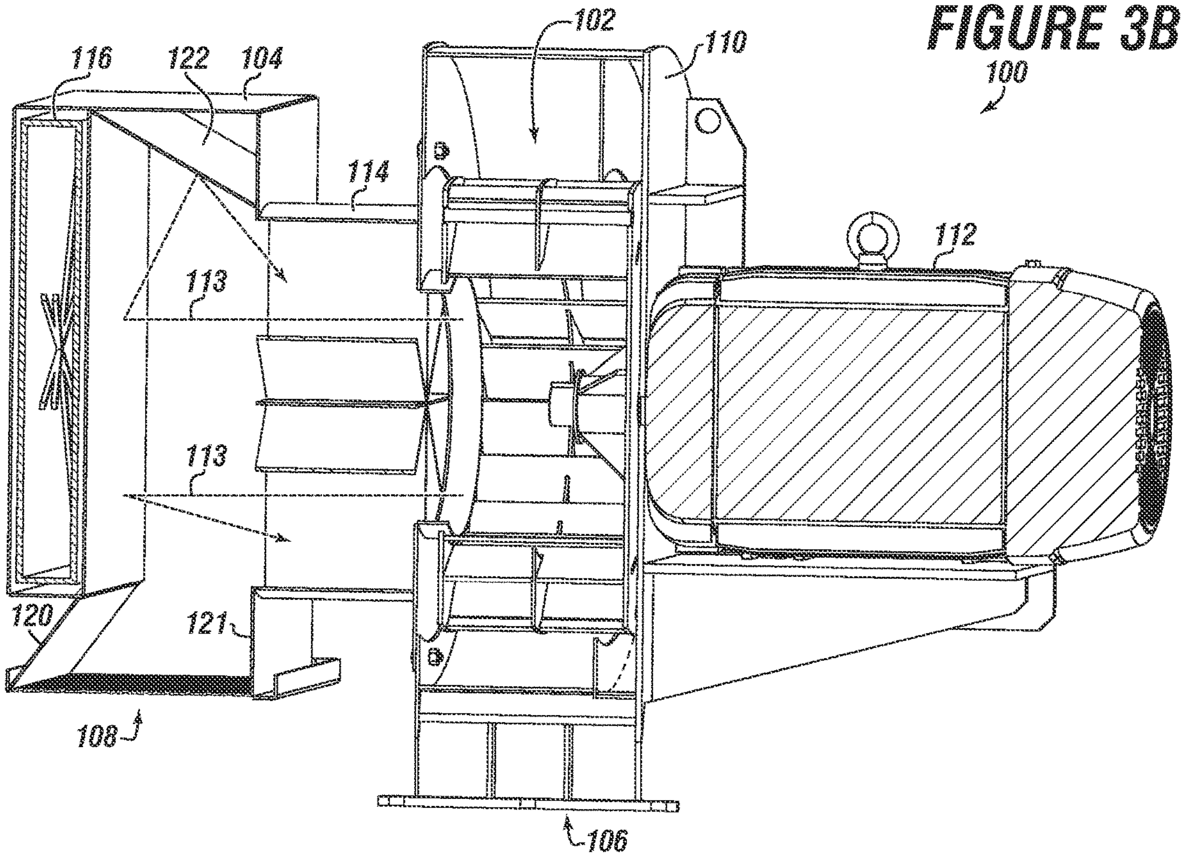
FIG. 3B is a cross-sectional, side view of the air blower showing an exemplary propagation of sound therethrough.

The propagation of sound in and through air blower 100 will now be discussed with reference to FIG. 3B. In operation, when sound emanates from blower 100, such as sound produced by impeller assembly 102 or by equipment that is downstream of and fluidly coupled with impeller assembly 102, at least some of the sound travels from or through impeller assembly 102 and toward air intake housing 104. The sound 113 emanating from impeller housing 110, or from equipment downstream of impeller housing 110, exits impeller housing 110 and enters the flow modulator tube assembly 114. The flow modulator tube assembly 114 at least partially muffles the sound that enters the flow modulator tube assembly 114. Without being bound by theory, the shape, volume, length, or combinations thereof of the modulated flow paths 128 of the flow modulator tube assembly 114 operate to modulate the sound passing therethrough. Furthermore, at least some of the sound passing from impeller housing 110 is reflected, refracted, attenuated, or combinations thereof by and/or within the flow modulator tube assembly 114 (e.g., by vanes 124 and/or shell 126).

Additionally, the directionality of the modulated flow paths 128 of the flow modulator tube assembly 114 direct the sound that propagates therethrough along a path to impact with sound damper 116. In FIG. 3B, the propagation of sound 113 is represented by broken lines. Sound damper 116 is positioned within air intake housing 104 to receive at least some of the sound that enters air intake housing 104 from the flow modulator tube assembly 114, and sound damper 116 absorbs at least some of the sound that impacts sound damper 116. Thus, sound damper 116 reduces the sound that emanates from blower 100 (e.g., that emanates out of air intake inlet 108). Sound damper 116 may be or include sound absorbing material, such as a foam or a metal. In one exemplary embodiment, sound damper 116 is or includes a compartment that contains steel wool (e.g., corrosion-resistant steel wool) that acts to absorb sound. Sound damper 116 may be a chamber or compartment within or coupled with air intake housing 104, and may include a pad of sound absorbing material positioned to receive sound waves that emanate from the flow modulator tube assembly 114.

Additionally, the non-linear flow path discussed with reference to FIG. 3A, also contributes to the attenuation of the sound emanating from blower 100. Sound that is not absorbed by sound damper 116 is reflected therefrom and, depending on the angle of reflection, may impact with baffles 120 and/or 122, or housing wall 121. Upon impact with baffles 120 and/or 122 or housing wall 121, sound may be absorbed, refracted, or reflected. Sound reflected from baffles 120 and/or 122 or housing wall 121 may be directed to sound damper 116 for absorption, or may continue to be reflected within housing 104 for further attenuation of sound. As such, the sound that emanates from blower 100, such as through inlet 108, is reduced in comparison with the sound that would emanate from blower 100 if blower 100 did not include the flow modulator tube assembly 114, sound damper 116, and the non-linear air intake flow path.

The sound abatement components disclosed herein, separate or combined, provide effective noise abatement for blower 100, while also providing ample air, such as for cooling of electric motors to maintain the motor at acceptable operating temperatures.

As shown in FIGS. 4A and 4B, in some embodiments, blower 100 is fluidly coupled with equipment (e.g., electric motor) or local environment 200 in system 1000. Blower 100 operates to provide cooling air and/or ventilation to equipment or local environment 200. Equipment or local environment 200 may be an induction motor used to drive a drawworks, a pump (e.g., a mud pump), a top drive, a drilling motor, or another piece of oil and gas drill site equipment. While described for use with oil and gas drill site equipment, the blower and motor disclosed herein may be used in other applications. Equipment or local environment 200 may be a local environment, such as a warehouse, factory, or other localized, generally enclosed environment. Cooling air may enter air blower 100 through inlet 108, pass through air blower 100 as described above, and exit air blower 100 through outlet 106. The outlet 106 may be in fluid communication with the equipment or local environment 200, such that the air exiting outlet 106, air 111, enters equipment or local environment 200 through an inlet, which is in fluid communication with outlet 106. Air 111 then flows through equipment or local environment 200 and exits at exit 202. The blower disclosed herein may be used in many different industrial applications such as sand blasting booths and ventilation. The electric motor disclosed herein may be used with a standard blower (as opposed to the noise abated blower disclosed herein) or without any blower at all.

Exemplary Embodiments

Some exemplary embodiments will now be described.

Embodiment 1. An air blower, the air blower comprising: an intake housing comprising an inlet, the inlet positioned to receive air into the air blower; a impeller, the impeller positioned to draw the air through the inlet and into the impeller; an outlet, the outlet positioned to receive air from the impeller and expel the air from the air blower; a flow modulator tube assembly positioned to receive the air from the intake housing and direct the air to the impeller, wherein the flow modulator tube assembly comprises a plurality of vanes positioned within a shell, the vanes extending axially along a length of the shell, wherein the vanes define a plurality of modulated air flow paths through the flow modulator tube assembly; and a sound damper positioned within the intake housing, wherein the flow modulator tube assembly is positioned to direct at least some sound traveling therethrough to the sound damper, and wherein the sound damper absorbs at least some of the sound directed thereto; wherein the flow modulator tube assembly and the sound damper attenuate sound emanating from the air blower during operation of the air blower.

Embodiment 2. The air blower of embodiment 1, wherein the intake housing and the flow modulator tube assembly are arranged relative to one another to define a non-linear flow path of the air from the intake housing into the flow modulator tube assembly.

Embodiment 3. The air blower of embodiment 1 or 2, wherein sound exiting the flow modulator tube assembly into the intake housing is directed away from the inlet.

Embodiment 4. The air blower of any of embodiments 1 to 3, wherein the inlet is at a 90-degree angle relative to the entrance of the flow modulator tube assembly.

Embodiment 5. The air blower of any of embodiments 1 to 4, further comprising one or more baffles positioned within the intake housing to deflect air, deflect sound, or combinations thereof.

Embodiment 6. The air blower of any of embodiments 1 to 5, wherein the vanes straighten the flow of the air and the propagation of sound through the flow modulator tube assembly.

Embodiment 7. The air blower of any of embodiments 1 to 6, wherein the vanes divide the air and sound into multiple, separate paths.

Embodiment 8. The air blower of any of embodiments 1 to 7, wherein the sound damper comprises foam, metal, or combinations thereof.

Embodiment 9. The air blower of any of embodiments 1 to 8, wherein the sound damper comprises stainless steel wool.

Embodiment 10. The air blower of any of embodiments 1 to 9, wherein at least some of sound is reflected from the sound damper within the intake housing.

Embodiment 11. A method of attenuating sound emanating from an air blower, the method comprising: directing at least some sound within the air blower through a flow modulator tube assembly that is positioned within an intake housing of the air blower, wherein the flow modulator tube assembly comprises a plurality of vanes positioned within a shell, the vanes extending axially along a length of the shell, and wherein the vanes define a plurality of modulated flow paths through the flow modulator tube assembly; and directing at least some of the sound from the flow modulator tube assembly to a sound damper that is positioned within the intake housing of the air blower, wherein the sound damper absorbs at least some of the sound.

Embodiment 12. The method of embodiment 11, wherein an intake housing of the air blower and the flow modulator tube assembly are arranged to define a non-linear flow path of air from the inlet to the entrance of the flow modulator tube assembly.

Embodiment 13. The method of embodiment 11 or 12, wherein sound exiting the flow modulator tube assembly is directed away from the inlet.

Embodiment 14. The method of any of embodiments 11 to 13, further comprising positioning one or more baffles within the air intake housing to deflect air, sound, or combinations thereof.

Embodiment 15. A system for providing cooling or ventilation, the system comprising: an air blower, the air blower comprising an intake housing comprising an inlet, the inlet positioned to receive air into the air blower; a impeller, the impeller positioned to draw the air through the inlet and into the impeller; an outlet, the outlet positioned to receive air from the impeller and expel the air from the air blower; a flow modulator tube assembly positioned to receive the air from the intake housing and direct the air to the impeller, wherein the flow modulator tube assembly comprises a plurality of vanes positioned within a shell, the vanes extending axially along a length of the shell, wherein the vanes define a plurality of modulated air flow paths through the flow modulator tube assembly; and a sound damper positioned within the intake housing, wherein the flow modulator tube assembly is positioned to direct at least some sound traveling therethrough to the sound damper, and wherein the sound damper absorbs at least some of the sound directed thereto; wherein the flow modulator tube assembly and the sound damper attenuate sound emanating from the air blower during operation of the air blower; wherein the outlet of the air blower is fluidly coupled with equipment or a local environment to provide air into the equipment or a local environment.

Embodiment 16. The system of embodiment 15, wherein the intake housing and the flow modulator tube assembly are arranged relative to one another to define a non-linear flow path of the air from the inlet into the flow modulator tube assembly.

Embodiment 17. The system of embodiment 15 or 16, wherein sound exiting the flow modulator tube assembly into the intake housing is directed away from the inlet.

Embodiment 18. The system of any of embodiments 15 to 17, wherein the inlet is at a 90-degree angle relative to the entrance of the flow modulator tube assembly.

Embodiment 19. The system of any of embodiments 15 to 18, further comprising one or more baffles positioned within the intake housing to deflect air, deflect sound, or combinations thereof.

Embodiment 20. The system of any of embodiments 15 to 19, wherein the vanes straighten the flow of the air and the propagation of sound through the flow modulator tube assembly.

Embodiment 21. The system of any of embodiments 15 to 20, wherein the vanes divide the air and sound into multiple, separate paths.

Embodiment 22. The system of any of embodiments 15 to 21, wherein the sound damper comprises foam, metal, or combinations thereof.

Embodiment 23. The system of any of embodiments 15 to 22, wherein the sound damper comprises stainless steel wool.

Embodiment 24. The system of any of embodiments 15 to 23, wherein at least some of the sound is reflected from the sound damper within the intake housing.

Embodiment 25. A method of attenuating sound emanating from an air blower and equipment or a local environment, the method comprising: directing at least some sound through a flow modulator tube assembly that is positioned within an intake housing of the air blower, wherein the flow modulator tube assembly comprises a plurality of vanes positioned within a shell, the vanes extending axially along a length of the shell, and wherein the vanes define a plurality of modulated flow paths through the flow modulator tube assembly; and directing at least some of the sound from the flow modulator tube assembly to a sound damper that is positioned within the intake housing of the air blower, wherein the sound damper absorbs at least some of the sound, wherein the sound is sound generated by the air blower, sound generated by the equipment, or sound emanating from the local environment.

Embodiment 26. The method of embodiment 25, wherein the intake housing of the air blower and the flow modulator tube assembly are arranged to define a non-linear flow path of air from the inlet to the entrance of the flow modulator tube assembly.

Embodiment 27. The method of embodiment 25 or 26, wherein sound exiting the flow modulator tube assembly is directed away from the inlet.

Embodiment 28. The method of any of embodiments 25 to 27, further comprising positioning one or more baffles within the air intake housing to deflect air, sound, or combinations thereof.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An air blower, the air blower comprising:

an intake housing comprising an inlet, the inlet positioned to receive air into the air blower;

an impeller, the impeller positioned to draw the air through the intake housing and into the impeller;

an outlet, the outlet positioned to receive air from the impeller and expel the air from the air blower;

a flow modulator tube assembly positioned to receive the air from the intake housing and direct the air to the impeller, wherein the flow modulator tube assembly comprises a shell and a plurality of vanes positioned within the shell, the vanes extending axially along a length of the shell and contacting the shell along the length of the shell, wherein the vanes define a plurality of separate air flow paths that extend through the flow modulator tube assembly, from a first end of the flow modulator tube assembly to a second end of the flow modulator tube assembly, and wherein the plurality of separate air flow paths are fluidically isolated from one another between the first and second ends;

a sound damper positioned in the intake housing, wherein the sound damper has a surface positioned to receive sound from the flow modulator tube assembly;

one or more baffles positioned within the intake housing, wherein each of the one or more baffles comprises an angled wall positioned at an angle relative to the surface of the sound damper such that the one or more baffles direct air from the intake housing into the flow modulator tube assembly;

wherein the vanes divide the air and sound into the plurality of separate air flow paths that comprise void spaces between the vanes and the shell, wherein the vanes straighten the flow of the air through the flow modulator tube assembly and direct the air to the impeller, and wherein the vanes straighten the propagation of sound through the flow modulator tube assembly and direct sound along a path to impact with the sound damper.

2. The air blower of claim 1, wherein the one or more baffles in the intake housing and the flow modulator tube assembly are arranged relative to one another to define a non-linear flow path of the air from the intake housing into the flow modulator tube assembly, and wherein the sound damper and the flow modulator tube assembly are arranged relative to one another to define a linear flow path of the sound from the flow modulator tube assembly to the sound damper.

3. The air blower of claim 1, wherein sound exiting the flow modulator tube assembly into the intake housing is directed away from the inlet and to the sound damper.

4. The air blower of claim 1, wherein the inlet is at a 90-degree angle relative to an entrance of the flow modulator tube assembly.

5. The air blower of claim 1, wherein the one or more baffles comprise a first baffle positioned within the intake housing at a reflex angle relative to the sound damper to deflect air into the flow modulator tube assembly and a second baffle positioned within the intake housing at an acute angle relative to the sound damper to deflect air into the flow modulator tube assembly.

6. The air blower of claim 5, wherein the sound damper is planar, and wherein the first and second baffles are arranged at angles relative to a plane of the sound damper.

7. The air blower of claim 1, wherein the volume and length of the plurality of separate air flow paths are configured to modulate sound passing therethrough.

8. The air blower of claim 1, wherein the sound damper comprises foam, metal, or combinations thereof.

9. The air blower of claim 8, wherein the sound damper comprises stainless steel wool.

10. The air blower of claim 1, wherein the sound damper reflects at least some of the sound directed thereto by the flow modulator tube assembly back into the flow modulator tube assembly.

11. A method of attenuating sound emanating from an air blower, the method comprising:

- providing an air blower having an intake housing, an impeller, a sound damper positioned in the intake housing, one or more baffles positioned within the intake housing, and a flow modulator tube assembly fluidly coupled between the intake housing and the impeller;
- receiving air in the intake housing and directing the air from the intake housing into the flow modulator tube assembly, wherein directing the air from the intake housing into the flow modulator tube assembly comprises deflecting the air off of the one or more baffles, wherein each of the one or more baffles comprises an angled wall positioned at an angle relative to a surface of the sound damper such that the one or more baffles direct the air from the intake housing into the flow modulator tube assembly;
- directing the air through a plurality of separate air flow paths in the flow modulator tube assembly and to the impeller, wherein the separate air flow paths extend from a first end of the flow modulator tube assembly to a second end of the flow modulator tube assembly and are fluidically isolated from one another between the first and second ends, wherein the separate air flow paths straighten the flow of the air through the flow modulator tube assembly and direct the air to the impeller;
- directing at least some sound from the impeller through the separate air flow paths in the flow modulator tube assembly and to the intake housing, wherein the air flow paths straighten the propagation of sound through the flow modulator tube assembly and direct sound along a path to impact with the sound damper, and wherein passing sound through the air flow paths attenuates sound emanating from the air blower during operation of the air blower.

12. The method of claim 11, wherein the one or more baffles in the intake housing of the air blower and the flow modulator tube assembly are arranged to define a non-linear flow path of air from the intake housing to an entrance of the flow modulator tube assembly, and wherein the sound damper and the flow modulator tube assembly are arranged to define a linear path of sound from the flow modulator tube assembly to the sound damper.

13. The method of claim 12, wherein sound exiting the flow modulator tube assembly is directed away from an inlet of the intake housing and to the sound damper.

14. The method of claim 11, wherein the one or more baffles comprise a first baffle positioned at a reflex angle relative to a plane of the sound damper and a second baffle positioned at an acute angle relative to a plane of the sound damper, wherein the first and second baffles are angled to deflect air into the flow modulator tube assembly.

15. The method of claim 11, wherein the sound is sound generated by the impeller or a motor of the air blower.

16. The method of claim 11, wherein the air blower is fluidly coupled with equipment, and wherein the sound includes sound that is generated by the equipment.

17. The method of claim 11, wherein the air blower is fluidly coupled with a local environment, and wherein the sound includes sound that is emanating from the local environment.

18. A system for providing cooling air or ventilation, the system comprising:

an air blower, the air blower comprising:

- an intake housing comprising an inlet, the inlet positioned to receive air into the air blower;
- an impeller, the impeller positioned to draw the air through the intake housing and into the impeller;
- an outlet, the outlet positioned to receive air from the impeller and expel the air from the air blower;
- a sound damper positioned in the intake housing;
- one or more baffles positioned within the intake housing, wherein each of the one or more baffles comprises an angled wall positioned at an angle relative to a surface of the sound damper such that the one or more baffles direct air from the intake housing into a flow modulator tube assembly;
- the flow modulator tube assembly positioned to receive the air from the inlet and direct the air to the impeller, wherein the flow modulator tube assembly comprises a plurality of vanes positioned within a shell, the vanes extending axially along a length of the shell, wherein the vanes define a plurality of separate air flow paths that extend through the flow modulator tube assembly, from a first end of the flow modulator tube assembly to a second end of the flow modulator tube assembly, and that are fluidically isolated from one another between the first and second ends, wherein the vanes contact the shell along the length of the shell and divide the air and sound into the plurality of separate air flow paths that comprise void spaces between the vanes, wherein the vanes straighten the flow of the air through the flow modulator tube assembly and direct the air to the impeller, and wherein the vanes straighten the propagation of sound through the flow modulator tube assembly and direct sound along a path to impact with the sound damper; and wherein:

(i) the outlet of the air blower is fluidly coupled with equipment to provide air into the equipment; or (ii) the outlet of the air blower is fluidly coupled with a local environment to provide air into the local environment.

19. The system of claim 18, wherein the outlet of the air blower is fluidly coupled with the equipment to provide air into the equipment, and wherein the flow modulator tube assembly attenuates sound generated by the equipment.

20. The system of claim 18, wherein the outlet of the air blower is fluidly coupled with the local environment to provide air into the local environment, and wherein the flow modulator tube assembly attenuates sound emanating from the local environment.

21. The system of claim 19, wherein the equipment comprises a motor or a pump.

22. The system of claim 20, wherein the local environment comprises a building.

23. An air blower, the air blower comprising:

an intake housing comprising an inlet, the inlet positioned to receive air into the air blower;

an impeller, the impeller positioned to draw the air through the intake housing and into the impeller;

an outlet, the outlet positioned to receive air from the impeller and expel the air from the air blower;

a flow modulator tube assembly positioned between the intake housing and the impeller, wherein the flow modulator tube assembly comprises a shell surrounding a plurality of vanes positioned within the shell, wherein the vanes define a plurality of paths within the shell that are fluidically isolated from one another;

a sound damper positioned in the intake housing, wherein the sound damper has a surface that is positioned to receive sound from the flow modulator tube assembly;

one or more baffles positioned within the intake housing, wherein each of the one or more baffles comprises an angled wall positioned at an angle relative to the surface of the sound damper such that the one or more baffles direct air from the intake housing into the flow modulator tube assembly;

wherein the paths of the flow modulator tube assembly direct the air to the impeller and direct sound to the sound damper.

24. The air blower of claim 23, wherein the one or more baffles comprises a first baffle positioned at a first angle relative to the sound damper and a second baffle positioned at a second angle relative to the sound damper, wherein the first angle is different than the second angle.

25. The air blower of claim 24, wherein the first angle is a reflex angle and the second angle is an acute angle.

26. The air blower of claim 23, wherein the surface of the sound damper is planar.

* * * * *